United States Patent
Murakami

(10) Patent No.: US 8,770,879 B2
(45) Date of Patent: Jul. 8, 2014

(54) RECORDING APPARATUS HAVING CONVEYING BELT AND SENSOR DETECTING POSITION OF CONVEYING BELT

(75) Inventor: Kenji Murakami, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 261 days.

(21) Appl. No.: 13/248,385

(22) Filed: Sep. 29, 2011

(65) Prior Publication Data

US 2012/0082499 A1    Apr. 5, 2012

(30) Foreign Application Priority Data

Sep. 30, 2010 (JP) ................. 2010-220871

(51) Int. Cl.
*B41J 13/08* (2006.01)
(52) U.S. Cl.
USPC ....... 400/635; 400/579; 271/198; 198/810.03
(58) Field of Classification Search
USPC ......................................... 400/635
See application file for complete search history.

(56) References Cited

U.S. PATENT DOCUMENTS

| | | | | |
|---|---|---|---|---|
| 3,956,632 A | * | 5/1976 | Hall et al. | 198/810.03 |
| 5,157,444 A | * | 10/1992 | Mori et al. | 198/810.03 |
| 5,479,241 A | * | 12/1995 | Hou et al. | 198/807 |
| 5,964,339 A | * | 10/1999 | Matsuura et al. | 198/810.03 |
| 6,402,005 B1 | * | 6/2002 | Huttelmaier et al. | 198/810.03 |
| 6,431,348 B2 | * | 8/2002 | Malmberg | 198/810.03 |
| 6,607,458 B2 | * | 8/2003 | Downing et al. | 399/165 |
| 6,786,325 B2 | * | 9/2004 | Powell | 198/810.03 |
| 7,416,074 B2 | * | 8/2008 | Otomo et al. | 198/810.03 |
| 7,905,346 B2 | * | 3/2011 | Enomoto | 198/807 |
| 2005/0150747 A1 | * | 7/2005 | Menendez et al. | 198/810.03 |
| 2007/0144871 A1 | * | 6/2007 | Tao et al. | 198/810.03 |
| 2010/0232819 A1 | * | 9/2010 | Kudo et al. | 399/303 |

FOREIGN PATENT DOCUMENTS

| | | |
|---|---|---|
| JP | 09-169449 | 6/1997 |
| JP | 2004-078082 | 3/2004 |

* cited by examiner

*Primary Examiner* — Jill Culler
(74) *Attorney, Agent, or Firm* — Banner & Witcoff, Ltd.

(57) ABSTRACT

A recording section is configured to record an image on a recording medium. An endless conveying belt has a surface disposed in confrontation with the recording section and is configured to move in a conveying direction with the recording medium supported by the surface, thereby conveying the recording medium in the conveying direction. A measuring section has a detecting region and configured to measure a position of the conveying belt with respect to a perpendicular direction that is perpendicular to the conveying direction. The measuring section includes an optical sensor that is configured to detect the position of the conveying belt with respect to the perpendicular direction. A sensor moving section is configured to move the sensor based on a measurement result of the measuring section, such that the conveying belt is detected in the detecting region.

19 Claims, 10 Drawing Sheets

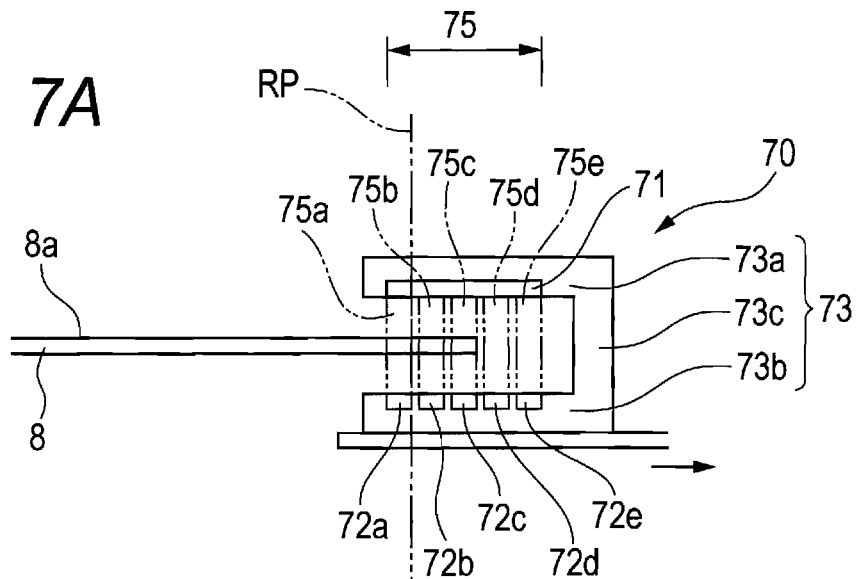
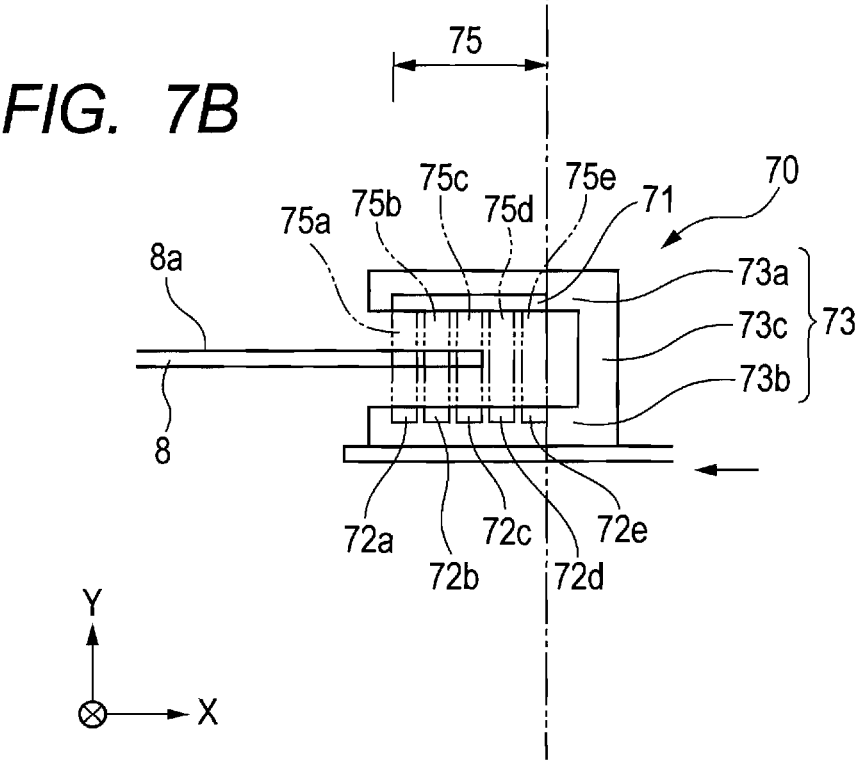

RECORDING APPARATUS HAVING CONVEYING BELT AND SENSOR DETECTING POSITION OF CONVEYING BELT

CROSS REFERENCE TO RELATED APPLICATIONS

This application claims priority from Japanese Patent Application No. 2010-220871 filed Sep. 30, 2010. The entire content of the priority application is incorporated herein by reference.

TECHNICAL FIELD

The invention relates to a recording apparatus that forms an image on a recording medium.

BACKGROUND

An image forming apparatus is known that includes a conveying belt (transfer belt), a sensor that detects a coordinate of a side end part of the conveying belt, and meandering correcting means (belt driving controller) for correcting meandering of the conveying belt based on detection results of the sensor.

SUMMARY

In the above-mentioned image forming apparatus, however, a detecting region of the sensor is fixed so as to be incapable of moving. Hence, if such meandering of the conveying belt occurs that exceeds meandering correcting capability of the meandering correcting means, the conveying belt goes out of the detecting region of the sensor, thereby preventing the sensor from detecting the coordinate of the conveying belt. Further, a sensor having a long detecting region is so expensive that manufacturing costs of the entire apparatus increase.

According to one or more aspects described herein, a recording apparatus includes a recording section, an endless conveying belt, a measuring section, and a sensor moving section. The recording section is configured to record an image on a recording medium. The endless conveying belt has a surface disposed in confrontation with the recording section and is configured to move in a conveying direction with the recording medium supported by the surface, thereby conveying the recording medium in the conveying direction. The measuring section has a detecting region and configured to measure a position of the conveying belt with respect to a perpendicular direction that is perpendicular to the conveying direction. The measuring section includes an optical sensor that is configured to detect the position of the conveying belt with respect to the perpendicular direction. The sensor moving section is configured to move the sensor based on a measurement result of the measuring section, such that the conveying belt is detected in the detecting region.

According to another aspect, the invention also provides a recording apparatus. The recording apparatus includes a recording section, an endless conveying belt, a measuring section, and a rotating section. The recording section is configured to record an image on a recording medium. The endless conveying belt has a surface disposed in confrontation with the recording section and is configured to move in a conveying direction with the recording medium supported by the surface, thereby conveying the recording medium in the conveying direction. The measuring section is configured to measure a position of the conveying belt with respect to a perpendicular direction that is perpendicular to the conveying direction. The measuring section includes a plurality of transmission-type sensors and a support plate. Each of the plurality of transmission-type sensors has a light emitting element, a light receiving element, a substantially U-shaped frame that supports the light emitting element and the light receiving element in confrontation with each other so as to form a detecting region between the elements. The support plate supports the plurality of transmission-type sensors. The measuring section is configured to measure a position of the conveying belt in the perpendicular direction based on detection results of the plurality of transmission-type sensors. The rotating section is configured to rotate the support plate about a rotational center. When straight lines passing through the rotational center and each detecting region of the plurality of transmission-type sensors are defined, the plurality of transmission-type sensors is arranged such that neighboring ones of the straight lines form a predetermined angle therebetween and that projective detecting regions are arranged continuously along an imaginary straight line passing through the rotational center on the support plate. Here, the projective detecting regions are defined by projecting each detecting region of the plurality of transmission-type sensors onto the imaginary straight line along a rotational direction. The rotating section is configured to rotate the support plate such that detection is performed in the detecting region of one of the plurality of transmission-type sensors.

BRIEF DESCRIPTION OF THE DRAWINGS

Embodiments in accordance with the invention will be described in detail with reference to the following figures wherein:

FIG. 7A is an enlarged view showing a situation in which the sensor is located at a first detecting position;

FIG. 7B is an enlarged view showing a situation in which the sensor is located at a second detecting position;

DETAILED DESCRIPTION

Figure 1:
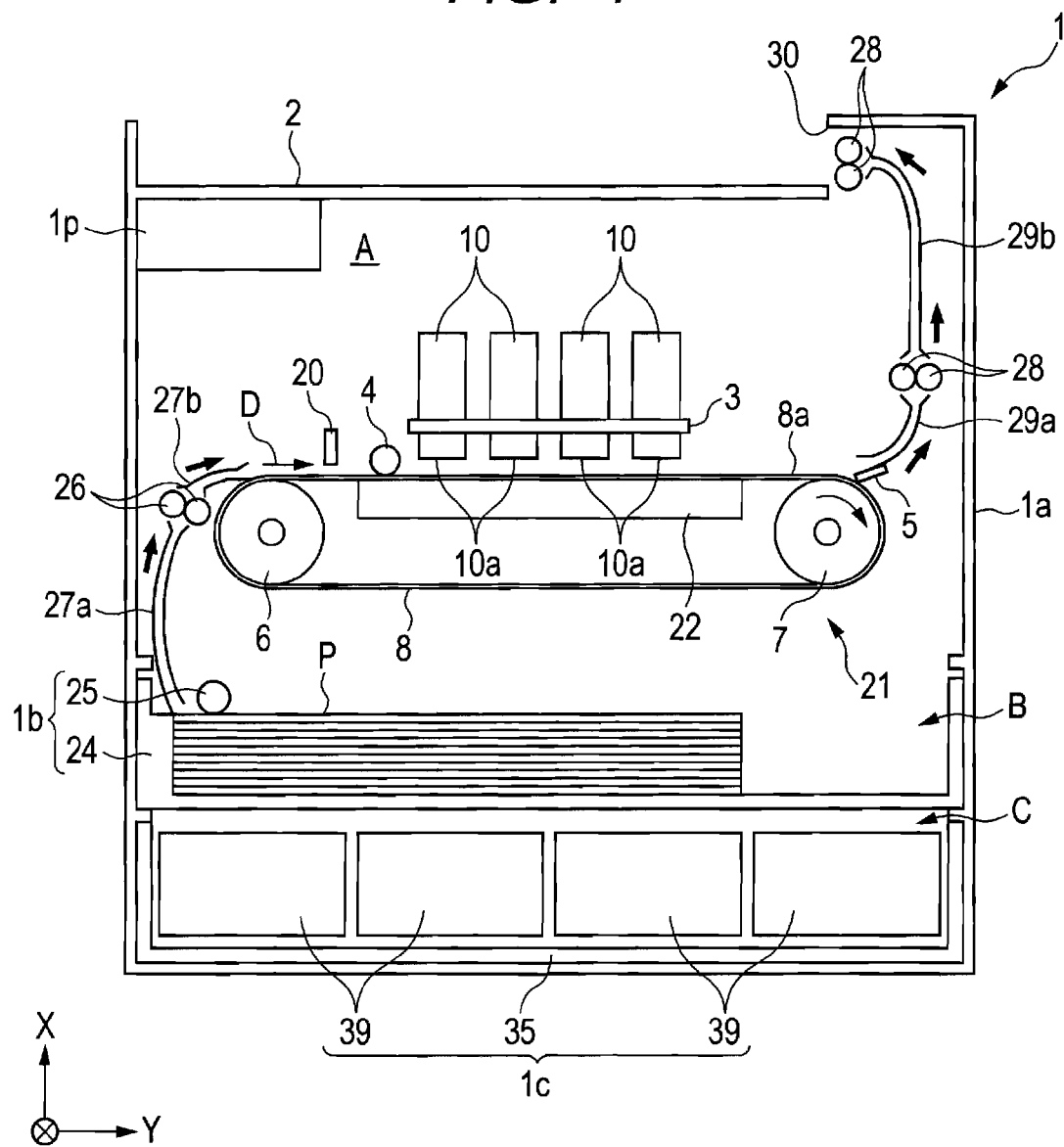
FIG. 1 is a schematic side view showing an overall configuration of an inkjet printer embodying a recording apparatus according to a first embodiment of the invention.

A recording apparatus according to embodiments of the invention will be described while referring to the accompanying drawings.

First, the overall configuration of an inkjet printer 1 embodying a recording apparatus according to a first embodiment of the invention will be described with reference to FIG. 1. In the following description, as shown in FIG. 1, the expressions "upper" and "lower" are used to define the various parts when the inkjet printer 1 is disposed in an orientation in which it is intended to be used.

The printer 1 has a casing 1a having a rectangular parallelepiped shape. A paper discharging section 2 is provided on a top plate of the casing 1a. The internal space of the casing 1a is divided into spaces A, B, and C in this order from the top. In the spaces A and B, a paper conveying path leading to the paper discharging section 2 is formed. In the space C, cartridges 39 as ink supply sources for inkjet heads 10 (hereinafter, simply referred to as "heads 10") are accommodated.

Four heads 10 that eject ink of magenta, cyan, yellow, and black colors respectively, a conveying unit 21 that conveys paper P in a conveying direction D (the direction from the left side toward the right side in FIG. 1), a guide unit that guides paper P, and the like are arranged in the space A. A controller 1p is disposed in the space A. The controller 1p controls operations of each section of the printer 1 and manages the overall operations of the printer 1. The controller 1p controls recording operations (a conveying operation of paper P by each section of the printer 1, an ink ejecting operation in synchronous with conveyance of paper P, and the like, based on image data supplied from an outside apparatus.

Figure 2:
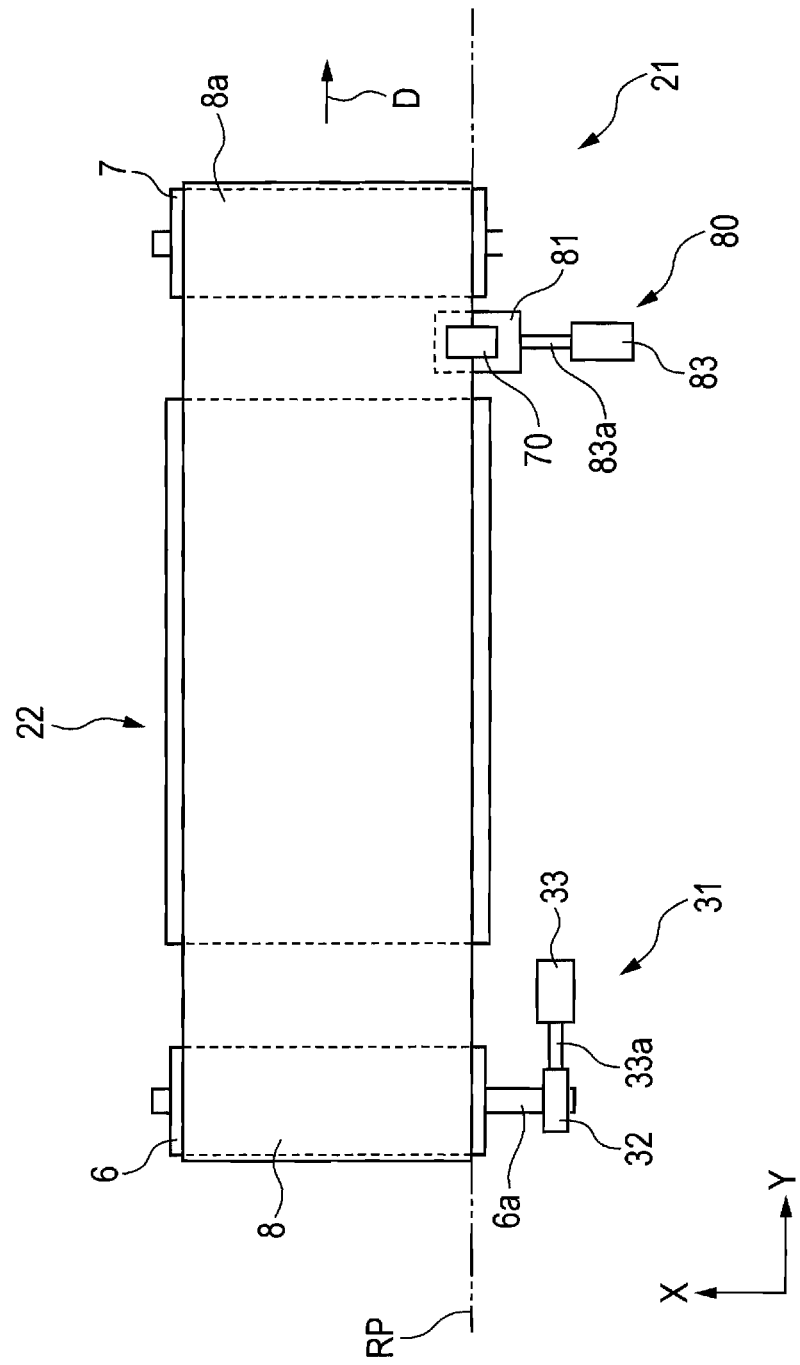
FIG. 2 is a schematic plan view of a conveying unit shown in FIG. 1.

As shown in FIGS. 1 and 2, the conveying unit 21 includes belt rollers 6 and 7, an endless-type conveying belt 8 looped around the both rollers 6 and 7, a nip roller 4 and a separation plate 5 arranged outside the conveying belt 8, an adhesion platen 22 disposed inside the conveying belt 8, and the like. The belt roller 7 is a drive roller, and rotates by driving of a conveying motor 121 (see FIG. 4) driven by the controller 1p in the clockwise direction in FIG. 1. Rotation of the belt roller 7 causes the conveying belt 8 to run so that a surface 8a in confrontation with the heads 10 moves in the conveying direction D. The belt roller 6 is a follow roller, and rotates in the clockwise direction in FIG. 1 by following the movement of the conveying belt 8.

The conveying belt 8 is made of polyimide or fluorine contained resin, for example, and has a volume resistivity of approximately $10^8$ to $10^{14}$ Ω·cm (ohm-centimeter) and flexibility. However, the conveying belt 8 may be made of any material as long as the conveying belt 8 can have a similar volume resistivity and flexibility. Here, a sub-scanning direction Y is a direction parallel to the conveying direction D of paper P by the conveying unit 21, and a main scanning direction X is a direction parallel to a horizontal surface and perpendicular to the sub-scanning direction Y.

The adhesion platen 22 includes a pair of comb-like electrodes (not shown) in which a plurality of elongated portions extending in the conveying direction D is arranged alternately in the main scanning direction X. By applying voltage to the electrodes, paper P sticks to the surface 8a of the conveying belt 8. The controller 1p controls a power source 36 to apply voltage to the adhesion platen 22.

The nip roller 4 is disposed at a position at an upstream end of the adhesion platen 22 and in confrontation with the elongated portions of the electrodes. The nip roller 4 presses paper P sent from the paper supplying unit 1b against the surface 8a of the conveying belt 8.

With this configuration, the controller 1p controls the belt roller 7 to rotate in the clockwise direction in FIG. 1, thereby causing the conveying belt 8 to move circularly. At this time, circular movement of the conveying belt 8 causes the belt roller 6 and the nip roller 4 to also rotate. Also, at this time, when the controller 1p controls the pair of comb-like electrodes of the adhesion platen 22 to be applied with voltages different from each other, positive or negative electric charge is generated at a portion of the conveying belt 8 in confrontation with paper P, electric charge with the opposite polarity is induced on a surface of the paper P in confrontation with the conveying belt 8, and these electric charges attract each other, which causes the paper P to stick to the conveying belt 8. In this way, the paper P sent out from the paper supplying unit 1b is conveyed in the conveying direction D while sticking to the conveying belt 8. Further, at this time, when the paper P conveyed while sticking to the conveying belt 8 passes positions directly below the heads 10, the controller 1p controls each head 10 to eject ink in each color toward the paper P. In this way, a desired color image is formed on the paper P. Each head 10 and the controller 1p serve as a recording section for recording images on paper P, as described above. The separation plate 5 is disposed to confront the belt roller 7 for separating the paper P from the surface 8a and guiding the paper P toward the downstream side in the conveying direction D.

As shown in FIG. 2, the printer 1 includes a meandering correcting mechanism 31 that corrects meandering (a position in the main scanning direction X) of the conveying belt 8 to a reference position RP, a sensor 70 that detects the position of the conveying belt 8 in the main scanning direction X by detecting one end of the conveying belt 8 in the main scanning direction X, and a moving mechanism 80 that moves the sensor 70 in the main scanning direction X. The meandering correcting mechanism 31 includes a bearing 32 that rotatably supports one end of a shaft 6a of the belt roller 6, and a motor 33 controlled by the controller 1p. Male thread is formed on an outer circumferential surface of a shaft 33a of the motor 33. The bearing 32 is formed with a hole in which the shaft 33a is inserted, and female thread meshing with the male thread of the shaft 33a is formed on an inner circumferential surface of the hole. With this configuration, when the controller 1p controls the shaft 33a of the motor 33 to rotate forward or reversely, the bearing 32 moves toward or away from the motor 33 in the sub-scanning direction Y. That is, the controller 1p controls tilt of the shaft 6a of the belt roller 6 based on detection of the position of the conveying belt 8 by the sensor 70 etc., thereby restoring the position of the conveying belt 8 in the main scanning direction X to the reference position RP for correcting meandering. Note that, while meandering of the conveying belt 8 is being corrected, the controller 1p drives the belt roller 7 so that conveying belt 8 moves in the conveying direction D. In this way, the meandering correcting mechanism 31 and the controller 1p serve as a meandering correcting section.

Figure 3:
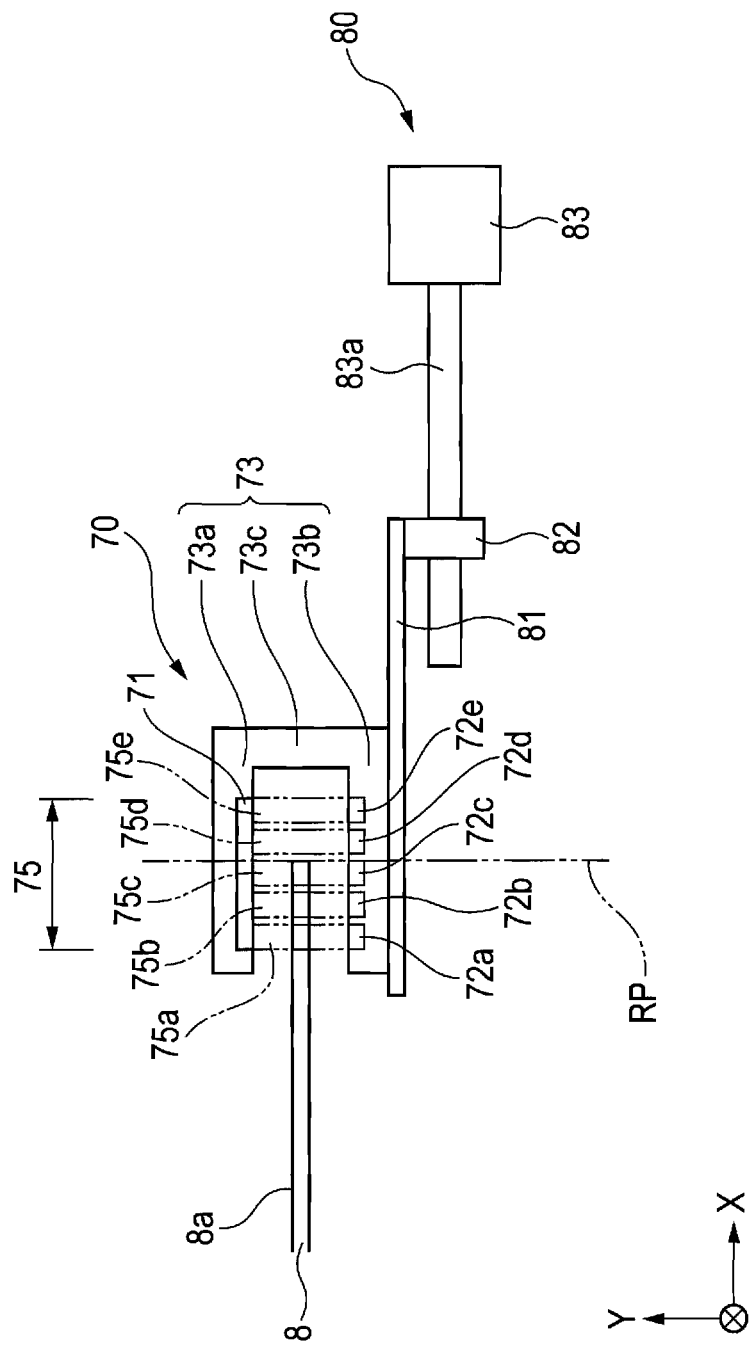
FIG. 3 is a side view of a sensor and a moving mechanism show in FIG. 2.

As shown in FIG. 3, the sensor 70 includes a light emitting element 71, five light receiving elements 72a through 72e, and a support frame 73 supporting the light emitting element 71 and the light receiving elements 72a through 72e. The sensor 70 is connected with the controller 1p. The support frame 73 includes a pair of confronting sections 73a and 73b. The confronting section 73a supports the light emitting element 71. The confronting section 73b supports the five light receiving elements 72a through 72e. The support frame 73 further includes a connecting section 73c that connects the pair of confronting sections 73a and 73b in a state where the light emitting element 71 and the light receiving elements 72a through 72e are in confrontation with each other. Thus, the support frame 73 is configured in substantially a U-shape (squared-U-shape) where a detecting region 75 is defined between the light emitting element 71 and the light receiving elements 72a through 72e.

The sensor 70 in the present embodiment is a transmission-type sensor that surrounds a one end portion of the conveying belt 8 in the main scanning direction X with the pair of confronting sections 73a and 73b and the connecting section 73c, and that detects the position of the conveying belt 8 in the main scanning direction X in the detecting region 75. However, a reflection-type sensor may be adopted, and an optical sensor of any type can be adopted.

The five light receiving elements 72a through 72e are arranged sequentially in the main scanning direction X. The light receiving element 72a is arranged at the farthest position from the connecting section 73c (the left side in FIG. 3 and the side closer to the conveying belt 8), whereas the light receiving element 72e is arranged at the closest position to the connecting section 73c (the right side in FIG. 3). The light receiving element 72c is located in the middle of the light receiving elements 72a and 72e. The light emitting element 71 extends in the main scanning direction X so as to confront the light receiving elements 72a through 72e. The detecting region 75 corresponds to the light receiving elements 72a through 72e, and consists of divisional detecting regions 75a through 75e arranged in the main scanning direction X. The position of the conveying belt 8 in the main scanning direction X is detected based on at which of the divisional detecting regions 75a through 75e the one end portion of the conveying belt 8 is located. That is, light receiving states of the light receiving elements 72a through 72e differ depending on the position of the conveying belt 8. For example, as shown in FIG. 3, when the one end portion of the conveying belt 8 is located at the divisional detecting region 75c, light from the light emitting element 71 is blocked by the conveying belt 8 at the light receiving elements 72a through 72c, while light from the light emitting element 71 is not blocked by the conveying belt 8 at the light receiving elements 72d and 72e. That is, the sensor 70 detects the position of the one end portion of the conveying belt 8 based on the light receiving states of the light receiving elements 72a through 72e. Then, if light from the light emitting element 71 is received by each of the light receiving elements 72a through 72e, each of the light receiving elements 72a through 72e outputs a detection signal (an ON signal) to the controller 1p. On the other hand, if light from the light emitting element 71 is not received by each of the light receiving elements 72a through 72e, each of the light receiving elements 72a through 72e outputs another detection signal (an OFF signal) to the controller 1p. The controller 1p determines the position of the conveying belt 8 based on the detection signals outputted from the sensor 70. Note that the conveying belt 8 is normally located at a reference position RP at which the OFF signals are outputted in the three divisional detecting regions 75a through 75c in a state where the sensor 70 is located at a reference detecting position (the position shown in FIG. 3). In other words, the conveying belt 8 is located at the reference position RP which is a position at which light emitted from the light emitting element 71 and traveling toward the light receiving elements 72a through 72c is blocked by the conveying belt 8 and where light emitted from the light emitting element 71 and traveling toward the light receiving elements 72d and 72e is not blocked by the conveying belt 8, in a state where the sensor 70 is located at the reference detecting position.

The moving mechanism 80 includes a board 81, a hollow cylindrical member 82, and a motor 83. The sensor 70 is fixed to one end of the board 81 in the main scanning direction X. The hollow cylindrical member 82 is fixed to another end of the board 81 in the main scanning direction X. A shaft 83a of the motor 83 is inserted in the hollow cylindrical member 82. Female thread is formed on an inner circumferential surface of the hollow cylindrical member 82, and male thread meshing with the female thread of the hollow cylindrical member 82 is formed on an outer circumferential surface of the shaft 83a. The motor 83 is controlled by the controller 1p. With this configuration, when the controller 1p controls the motor 83 to rotate forward or reversely, the sensor 70 moves rightward or leftward in FIG. 3 from the reference detecting position (the position shown in FIG. 3) where the position of the conveying belt 8 in the main scanning direction X can be detected in the detecting region 75. In the present embodiment, the moving mechanism 80 moves the sensor 70 between: a first detecting position (see FIG. 7A) which is a position moved rightward in FIG. 3 from the sensor 70 located at the reference detecting position and at which the sensor 70 is disposed so that the divisional detecting region 75c is located at the position of the divisional detecting region 75e; and a second detecting position (see FIG. 7B) which is a position moved leftward in FIG. 3 from the sensor 70 located at the reference detecting position and at which the sensor 70 is disposed so that the divisional detecting region 75c is located at the position of the divisional detecting region 75a. That is, the moving mechanism 80 moves the sensor 70 linearly between the first detecting position and the second detecting position. In this way, the moving mechanism 80 and the controller 1p serve as a sensor moving section that moves the sensor 70.

The motor 83 is a stepping motor in this embodiment. The controller 1p determines the position of the sensor 70 (the reference detecting position, the first detecting position, or the second detecting position) based on a driving amount of the motor 83. Further, the controller 1p determines how far the belt 8 is deviated from the reference position RP, based on the position of the sensor 70 and on a detection result of the sensor 70. Thus, the controller 1p controls the meandering correcting mechanism 31 such that the one end portion of the belt 8 is kept at the reference position RP, based on the detection result of the sensor 70 located at each detecting position. Instead of using a stepping motor, the position of the sensor 70 may be determined by providing another sensor that detects the position of the sensor 70.

As a modification, the moving mechanism 80 may move the sensor 70 in the main scanning direction X so that the divisional detecting region 75a is located at the position of the divisional detecting region 75e of the sensor 70 disposed at the reference detecting position and that the divisional detecting region 75e is located at the position of the divisional detecting region 75a of the sensor 70 disposed at the reference detecting position. With this modification, apparent length of the detecting region 75 of the sensor 70 in the main scanning direction X can be further increased.

As shown in FIG. 1, each head 10 is a line head having substantially a rectangular parallelepiped shape elongated in the main scanning direction X. The lower surface of each head 10 is an ejection surface 10a in which a large number of ejection ports are opened. During recording (image formation), ink of black, magenta, cyan, and yellow colors is ejected from the ejection surface 10a of a corresponding one of the four heads 10, respectively. The heads 10 are arranged in the sub-scanning direction Y with a predetermined pitch, and are supported by the casing 1a via a head holder 3. The head holder 3 holds the heads 10 such that the ejection surface 10a confronts a surface 8a of an upper loop of the conveying belt 8 and that a predetermined gap suitable for recording is formed between the ejection surface 10a and the surface 8a.

The guide unit includes the upstream-side guide section and the downstream-side guide section which are arranged with the conveying unit 21 interposed therebetween. The upstream-side guide section includes two guides 27a and 27b and a pair of feed rollers 26. The upstream-side guide section connects a paper supplying unit 1b (described later) and the conveying unit 21. The downstream-side guide section includes two guides 29a and 29b and two pairs of feed rollers 28. The downstream-side guide section connects the conveying unit 21 and the paper discharging section 2.

In the space B, the paper supplying unit 1b is disposed so as to be detachable from the casing 1a. The paper supplying unit 1b includes a paper supplying tray 24 and a paper supplying roller 25. The paper supplying tray 24 is a box which is opened upward, and can accommodate paper P in a plurality of sizes. The paper supplying roller 25 picks up paper P at the topmost position in the paper supplying tray 24 and supplies the same to the upstream-side guide section.

As described above, in the spaces A and B, a paper conveying path is formed from the paper supplying unit 1b via the conveying unit 21 to the paper discharging section 2. Based on a print command received from the outside apparatus, the controller 1p drives a paper supplying motor 125 (see FIG. 4) for the paper supplying roller 25, a feed motor 127 (see FIG. 4) for feed rollers of each guide section, the conveying motor 121 (see FIG. 4), and the like. Paper P sent out of the paper supplying tray 24 is supplied to the conveying unit 21 by the feed rollers 26. At this time, as describe above, the controller 1p controls the power source 36 so that paper P conveyed onto the conveying belt 8 adheres to the surface 8a. When paper P passes positions directly below each head 10 in the conveying direction, ink in each color is ejected from the heads 10 sequentially so that a color image is formed on the paper P. Ejecting operations of ink are performed based on detection signals from a paper sensor 20. The paper P is then separated by the separation plate 5 and is conveyed upward by the two pairs of feed rollers 28. Further, the paper P is discharged onto the paper discharging section 2 through an opening 30 at the top of the apparatus.

In the space C, a cartridge unit 1c is disposed so as to be detachable from the casing 1a. The cartridge unit 1c includes a tray 35 and four cartridges 39 arranged side by side within the tray 35. Each cartridge 39 supplies ink to a corresponding one of the heads 10 via a tube (not shown).

Next, the electrical configuration of the printer 1 will be described with reference to FIGS. 4 and 5.

Figure 4:
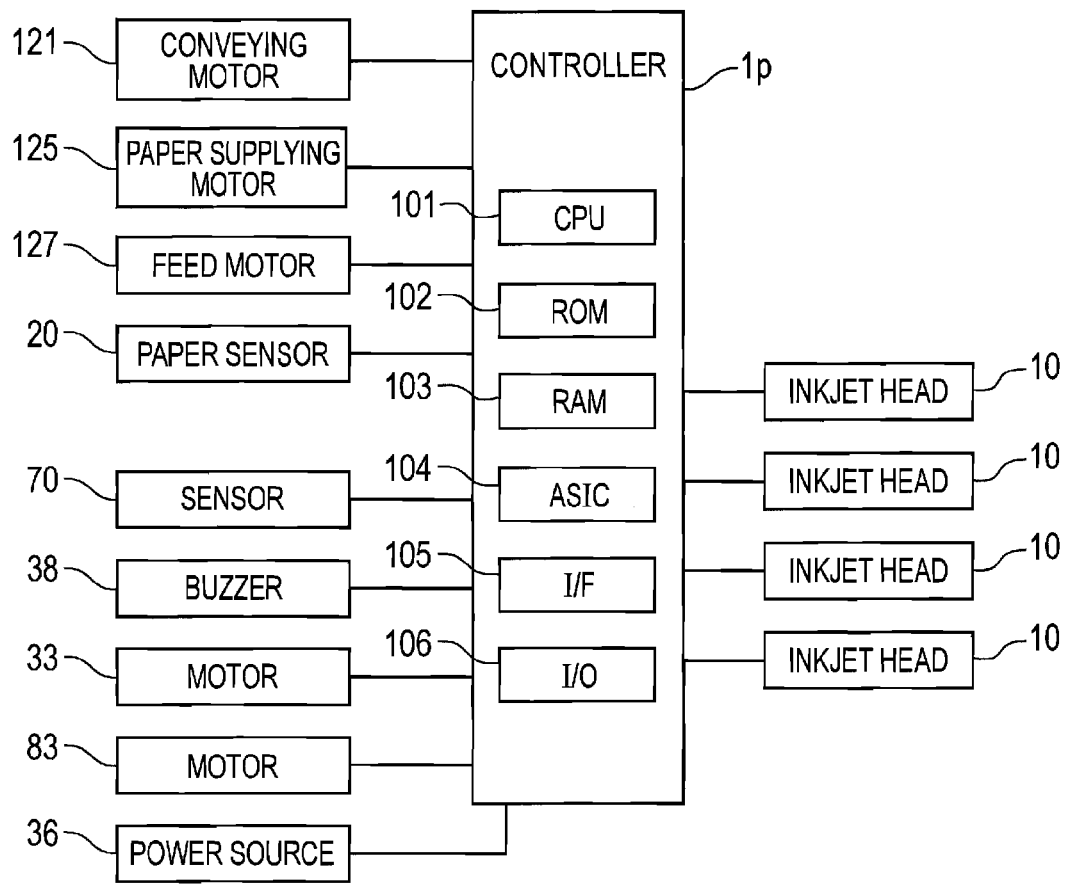
FIG. 4 is a block diagram showing an electrical configuration of the printer.
Figure 5:
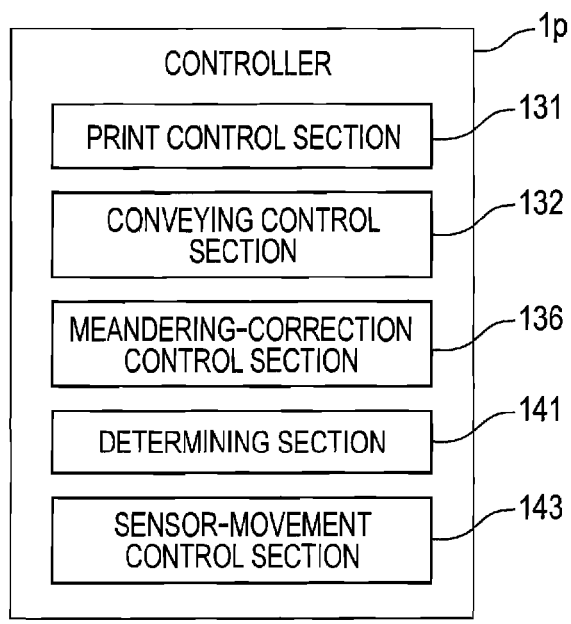
FIG. 5 is a block diagram showing a schematic configuration of a controller shown in FIG. 1.

As shown in FIG. 4, the controller 1p includes a CPU (Central Processing Unit) 101 which is an arithmetic processing unit, a ROM (Read Only Memory) 102, a RAM (Random Access Memory: including non-volatile RAM) 103, an ASIC (Application Specific Integrated Circuit) 104, an I/F (Interface) 105, an I/O (Input/Output Port) 106, and the like. The ROM 102 stores programs executed by the CPU 101, various fixed data, and the like. The RAM 103 temporarily stores data needed when the programs are executed (for example, image data of an image to be recorded on paper P). The ASIC 104 performs rewriting, rearranging, etc. of image data (for example, signal processing and image processing). The I/F 105 performs transmission and reception of data with an external apparatus. The I/O 106 performs input and output of detection signals of various sensors.

The controller 1p is connected with each motor 121, 125, 127, 33, and 83, the paper sensor 20, the sensor 70, the power source 36, a buzzer 38, a control board of each head 10, and the like. As shown in FIG. 5, the controller 1p serves as functioning sections such as a print control section 131, a conveying control section 132, a meandering-correction control section 136, a determining section 141, a sensor-movement control section 143, etc. configured by the above-described hardware.

The print control section 131 controls ejection of ink from each head 10 based on image data supplied from an external device, so that ink is ejected onto paper P. At this time, the print control section 131 controls each head 10 to start ejection of ink onto paper P a predetermined period after the paper sensor 20 detects a leading edge of the paper P. Here, the predetermined period is a time period that is obtained by dividing a distance by a conveying speed of paper P, the distance being a distance along the conveying path from the leading edge of paper P when the paper sensor 20 detects the leading edge of the paper P to an ejection port (not shown), located at the farthest upstream, of the head 10 located at the farthest upstream.

The conveying control section 132 controls the paper supplying motor 125, the conveying motor 121, the feed motor 127, and the power source 36, so that paper P is conveyed from the paper supplying unit 1b to the paper discharging section 2 when image data is supplied to the controller 1p. Further, the conveying control section 132 controls the conveying motor 121 to stop movement of the conveying belt 8 when the determining section 141 makes a determination as an error.

The meandering-correction control section 136 controls the motor 33 and the conveying motor 121 to restore the conveying belt 8 to the reference position RP based on detection signals from the sensor 70. That is, the meandering-correction control section 136 controls the motor 33 and the conveying motor 121 to restore the conveying belt 8 to the reference position RP, based on measurement results by a measuring section that is configured by the controller 1p and the sensor 70 for measuring the position of the conveying belt 8 in the main scanning direction X.

The determining section 141 determines that an error occurs that detection of the conveying belt 8 in the main scanning direction X cannot be performed, if a detection state changes from ON to OFF in the divisional detecting region 75e of the sensor 70 located at the first detecting position. That is, it is determined that an error occurs that detection of the conveying belt 8 in the main scanning direction X cannot be performed, if a detection signal outputted from the light receiving element 72e changes from an ON signal to an OFF signal. Further, the determining section 141 determines that an error occurs that detection of the conveying belt 8 in the main scanning direction X cannot be performed, if the detection state changes from OFF to ON in the divisional detecting region 75a of the sensor 70 located at the second detecting position. That is, it is determined that an error occurs that detection of the conveying belt 8 in the main scanning direction X cannot be performed, if a detection signal outputted from the light receiving element 72a changes from an OFF signal to an ON signal. This error (in which detection of the conveying belt 8 in the main scanning direction X cannot be performed) means a case where there is possibility that the conveying belt 8 moves out of the detecting region 75 due to such a large amount of meandering that controls by the meandering-correction control section 136 cannot follow the meandering of the conveying belt 8. At this time, the determining section 141 controls the buzzer 38 (see FIG. 4) to emit a sound if it is determined that the error occurs. Thus, the user can be encouraged to perform a maintenance operation for restoring the conveying belt 8 to the reference position RP.

The sensor-movement control section 143 controls the motor 83, so that the sensor 70 moves from the reference detecting position to the first detecting position if the detection state changes from ON to OFF in the divisional detecting region 75e of the sensor 70 located at the reference detecting position. Further, the sensor-movement control section 143 controls the motor 83, so that the sensor 70 moves from the reference detecting position to the second detecting position if the detection state changes from OFF to ON in the divisional detecting region 75a of the sensor 70 located at the reference detecting position. Further, the sensor-movement control section 143 controls the motor 83, so that the sensor 70 moves from the first detecting position to the reference detecting position if the detection state changes from OFF to ON in the divisional detecting region 75a of the sensor 70 located at the first detecting position. Further, the sensor-movement control section 143 controls the motor 83, so that the sensor 70 moves from the second detecting position to the reference detecting position if the detection state changes from ON to OFF in the divisional detecting region 75e of the sensor 70 located at the second detecting position. Because the sensor-movement control section 143 controls the sensor 70 to move its position, the conveying belt 8 can be detected reliably in the detecting region 75 of the sensor 70.

Figure 6:
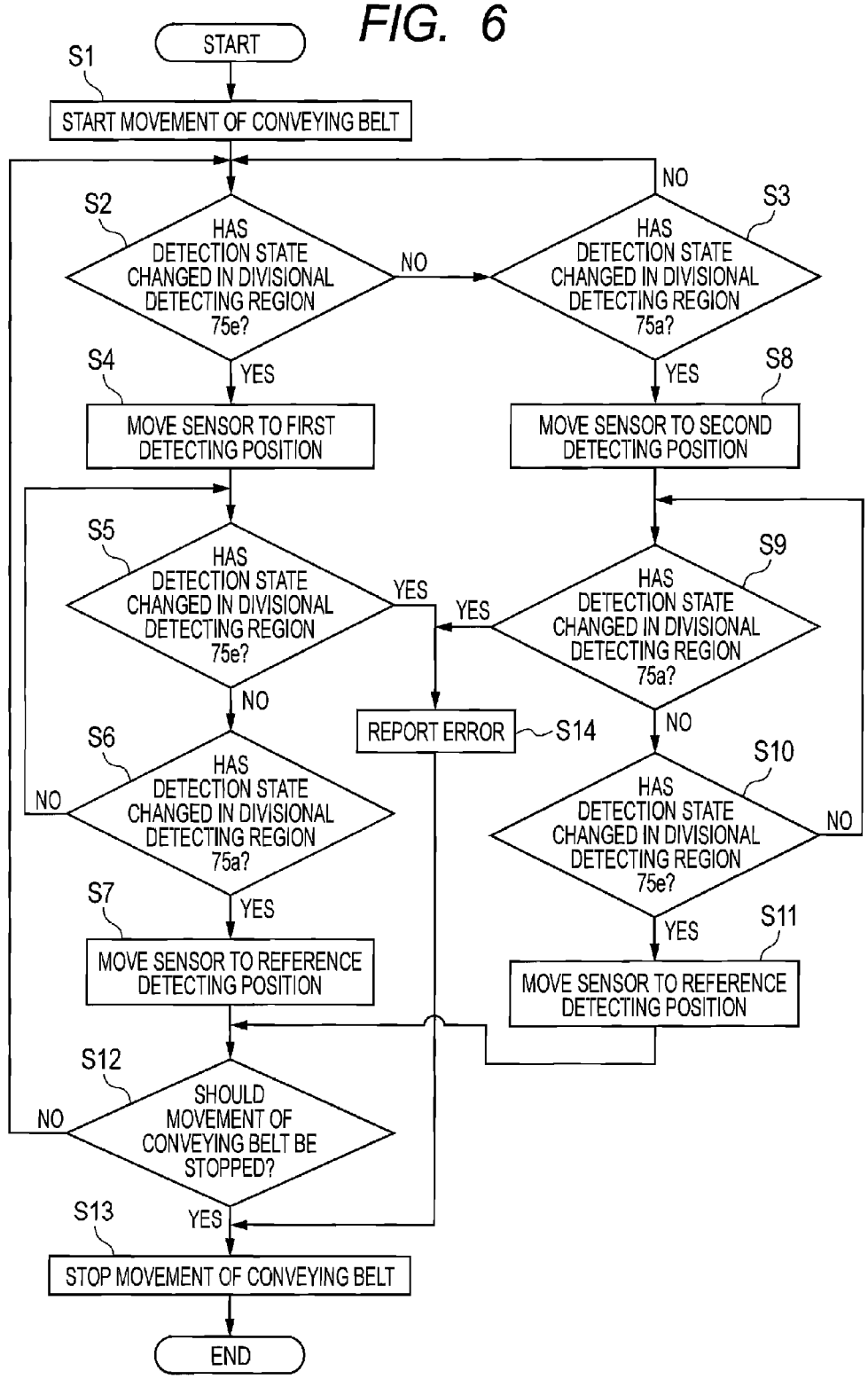
FIG. 6 is a flowchart showing a sensor moving operation executed by the controller of the printer.

Next, a sensor moving operation in response to meandering of the conveying belt 8 will be described below with reference to FIGS. 3, 6, 7A, and 7B. As shown in FIG. 6, in step 1 (S1), the controller 1p of the printer 1 controls the conveying motor 121 to move the conveying belt 8. Normally, movement of the conveying belt 8 is started when a recording operation onto paper P is performed.

In step 2 (S2), if the detection state has not changed in the divisional detecting region 75e of the sensor 70 located at the reference detecting position shown in FIG. 3 (S2: NO), the controller 1p proceeds to step 3 (S3). If the detection state has changed (S2: YES), the controller 1p proceeds to step 4 (S4). In step 3, if the detection state has not changed in the divisional detecting region 75a of the sensor 70 located at the reference detecting position (S3: NO), the controller 1p returns to step 2. If the detection state has changed (S3: YES), the controller 1p proceeds to step 8 (S8). Note that, if meandering occurs in the conveying belt 8 during a period before the detection state changes in the divisional detecting region 75a or 75e, the meandering-correction control section 136 controls the motor 33 and the conveying motor 121 to perform meandering correction for restoring the conveying belt 8 to the reference position RP. Then, if the detection state changes in the divisional detecting region 75a or 75e regardless of the fact that the meandering correction is performed, the controller 1p proceeds to either step 4 or step 8 as described above.

Note that, in the present embodiment, both the meandering correction and the sensor moving operation are performed. More specifically, because meandering of the conveying belt is very slow (because tension is applied to the conveying belt 8), the meandering correction is executed once in approximately two to three seconds, based on detection of the sensor 70. Because the meandering correction is performed, the conveying belt normally moves so as to fall within the detection region 75 of one sensor 70. However, if an excessive load occurs in the conveying belt 8 (when the conveying belt 8 starts moving, when paper jam occurs, etc.), the meandering correction sometimes cannot follow large meandering, and the conveying belt 8 moves out of the detection region 75 of the sensor 70. As a countermeasure for this large meandering, the sensor 70 is moved so that the meandering correction can continue without an error.

In step 4, the sensor-movement control section 143 controls the motor 83 to move the sensor 70 from the reference detecting position to the first detecting position as shown in FIG. 7A. In step 5 (S5), the controller 1p proceeds to step 14 (S14) if the detection state has changed in the divisional detecting region 75e (S5: YES), and proceeds to step 6 (S6) if the detection state has not changed (S5: NO). In step 6, the controller 1p proceeds to step 7 (S7) if the detection state has changed in the divisional detecting region 75a (S6: YES), and returns to step 5 if the detection state has not changed (S6: NO). In step 7, the sensor-movement control section 143 controls the motor 83 to move the sensor 70 from the first detecting position to the reference detecting position. Then, the controller 1p proceeds to step 12 (S12). Note that, at this time, too, the meandering-correction control section 136 performs meandering correction continuously.

In step 8, the sensor-movement control section 143 controls the motor 83 to move the sensor 70 from the reference detecting position to the second detecting position as shown in FIG. 7B. In step 9 (S9), the controller 1p proceeds to step 14 (S14) if the detection state has changed in the divisional detecting region 75a (S9: YES), and proceeds to step 10 (S10) if the detection state has not changed (S9: NO). In step 10, the controller 1p proceeds to step 11 (S11) if the detection state has changed in the divisional detecting region 75e (S10: YES), and returns to step 9 if the detection state has not changed (S10: NO). In step 11, the sensor-movement control section 143 controls the motor 83 to move the sensor 70 from the second detecting position to the reference detecting position. Then, the controller 1p proceeds to step 12 (S12). Note that, at this time, too, the meandering-correction control section 136 performs meandering correction continuously.

In step 12, the controller 1p determines whether movement of the conveying belt 8 should be stopped. If movement of the conveying belt 8 should not be stopped (S12: NO), the controller 1p returns to step 2. On the other hand, if a recording operation etc. onto paper P is finished and movement of the conveying belt 8 should be stopped (S12: YES), the controller 1p proceeds to step 13 (S13).

In step 14, the determining section 141 determines that an error occurs that detection of the position of the conveying belt 8 in the main scanning direction X cannot be performed, and controls the buzzer 38 to inform the user that an error occurs. In this way, the user is encouraged to perform a maintenance operation for restoring the conveying belt 8 to the reference position RP. In step 13, the conveying control section 132 controls the conveying motor 121 to stop movement of the conveying belt 8. Then, the sensor moving operation in response to meandering of the conveying belt 8 is finished.

As described above, according to the printer 1 of the present embodiment, even when the conveying belt 8 meanders in the main scanning direction X, the sensor 70 moves so that the conveying belt 8 can be detected in the detecting region 75. That is, the sensor 70 moves from the reference detecting position to the first or second detecting position. Hence, apparent length of the detecting region 75 of the sensor 70 in the main scanning direction X increases, and the position of the conveying belt 8 in the main scanning direction X can be detected even when the conveying belt 8 meanders greatly. In addition, it is not necessary to use a sensor with a detecting region that is especially long in the main scanning direction, thereby suppressing an increase in manufacturing costs of the apparatus. In the present embodiment, the sensor 70 is movable to three positions of the reference detecting position, the first detecting position, and the second detecting position. Alternatively, the sensor 70 may be movable to more than three positions.

An inkjet printer according to a second embodiment of the invention will be described while referring to FIGS. 8A and 8B. With the inkjet printer of the present embodiment, three sensors 70a through 70c are provided, and only a moving mechanism 280 for moving the sensors 70a through 70c differs from the moving mechanism 80 in the first embodiment. Accordingly, like parts and components are designated by the same reference numerals to avoid duplicating description. The three sensors 70a through 70c are similar to the sensor 70 in the first embodiment.

The moving mechanism 280 in the present embodiment includes a circular board (support plate) 281 to which the three sensors 70a through 70c are fixed, and a motor 283 of which shaft 283a is fixed to a center of the board 281. The motor 283 is connected with the controller 1p.

The board 281 supports the three sensors 70a through 70c so that neighboring two of straight lines L1 through L3 form a predetermined angle θ, when the straight lines L1 through L3 are defined as straight lines passing through a rotational center E and each detecting region 75 of the three sensors 70a through 70c. Also, the board 281 supports the three sensors 70a through 70c so that three projective detecting regions 76 of the sensors 70a through 70c are arranged continuously (seamlessly) along an imaginary straight line L4 passing through the rotational center E. Here, the projective detecting regions 76 are formed by projecting each detecting region 75 of the sensors 70a through 70c along rotational directions onto the imaginary straight line L4. The projective detecting regions 76 of the sensors 70a through 70c partly overlap each other.

Figure 8A:
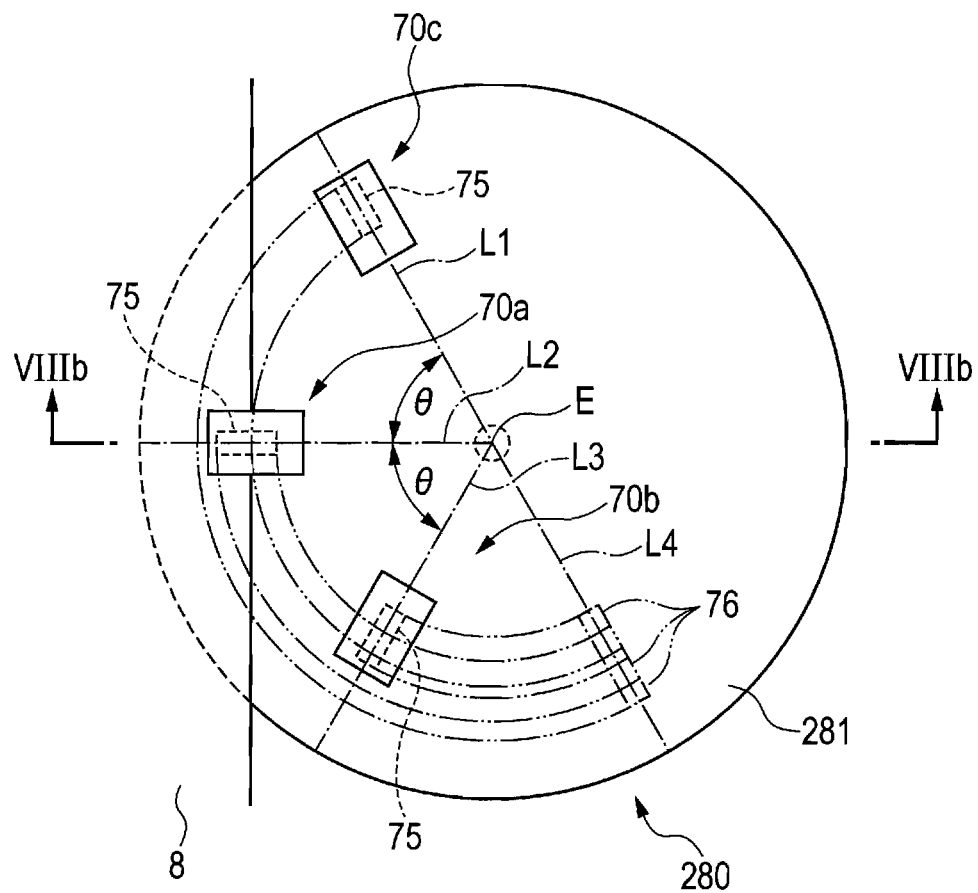
FIG. 8A is a plan view showing a sensor and a moving mechanism according to a second embodiment of the invention.
Figure 8B:
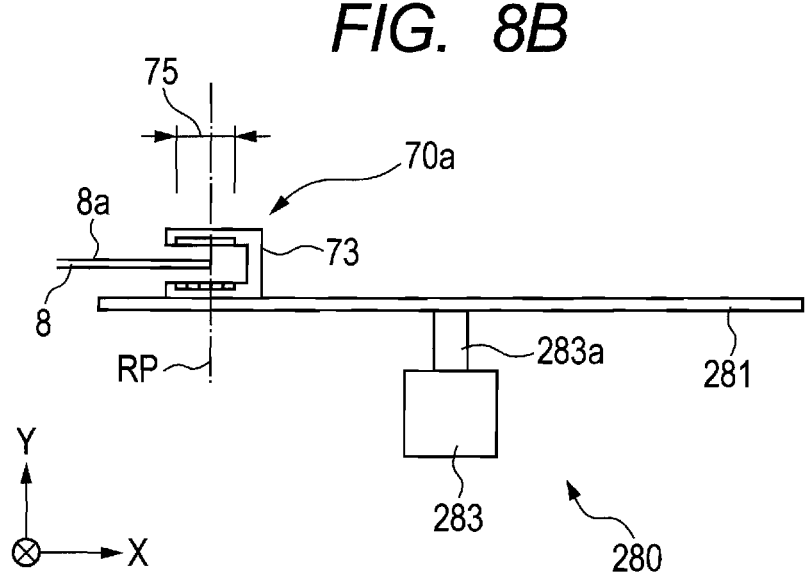
FIG. 8B is a cross-sectional view taken along a line VIIIb-VIIIb shown in FIG. 8A.

With this configuration, when the controller 1p controls the motor 283 to rotate forward so that board 281 rotates by the angle θ, the sensor 70a normally located at a reference detecting position shown in FIG. 8A moves rotatingly in the clockwise direction (upward in FIG. 8A), and the sensor 70b is disposed at a first detecting position on the straight line L2. On the other hand, when the controller 1p controls the motor 283 to rotate reversely so that board 281 rotates by the angle θ, the sensor 70a located at the reference detecting position moves rotatingly in the counterclockwise direction (downward in FIG. 8A), and the sensor 70c is disposed at a second detecting position on the straight line L2. In this way, by controls of the controller 1p, the three sensors 70a through 70c move to the reference detecting position, the first detecting position, and the second detecting position on the straight line L2. Here, the divisional detecting region 75e of the sensor 70a and the divisional detecting region 75c of the sensor 70b overlap each other in the rotational direction. Additionally, the divisional detecting region 75a of the sensor 70a and the divisional detecting region 75c of the sensor 70c overlap each other in the rotational direction. That is, apparent length (length in the main scanning direction X) of the detecting region obtained by arranging the three sensors 70a through 70c at the reference detecting position, the first detecting position, and the second detecting position on the straight line L2 is the same as apparent length of the detecting region obtained by movement of the sensor 70 in the first embodiment. As described above, the moving mechanism 280 and the controller 1p serve as a rotating section that moves the sensors 70a through 70c.

A moving operation of the three sensors 70a through 70c in the present embodiment is performed by controls that are approximately the same as those in the first embodiment. That is, if the detection state has changed in the divisional detecting region 75e of the sensor 70a located at the reference detecting position, the sensor 70b is moved to the first detecting position. Then, if the detection state has changed in the divisional detecting region 75e of the sensor 70b, the determining section 141 determines that an error occurs and processes similar to the above-described steps 13 and 14 are performed. If the detection state has changed in the divisional detecting region 75a of the sensor 70b, the sensor 70a is moved to the reference detecting position.

If the detection state has changed in the divisional detecting region 75a of the sensor 70a located at the reference detecting position, the sensor 70c is moved to the second detecting position. Then, if the detection state has changed in the divisional detecting region 75a of the sensor 70c, the determining section 141 determines that an error occurs and processes similar to the above-described steps 13 and 14 are performed. If the detection state has changed in the divisional detecting region 75e of the sensor 70c , the sensor 70a is moved to the reference detecting position. Then, processes similar to the above-described steps 12 and 13 are performed.

As described above, according to the printer of the present embodiment, too, even when the conveying belt 8 meanders in the main scanning direction X, the board 281 rotates so that the conveying belt 8 can be detected in the detecting region 75 of one of the three sensors 70a through 70c. Hence, apparent length of the detecting region 75 of the sensors 70a through 70c in the main scanning direction X increases, and the position of the conveying belt 8 in the main scanning direction X can be detected even when the conveying belt 8 meanders greatly. In addition, it is not necessary to use a sensor with a detecting region that is especially long in the main scanning direction, thereby suppressing an increase in manufacturing costs of the apparatus.

Figure 9:
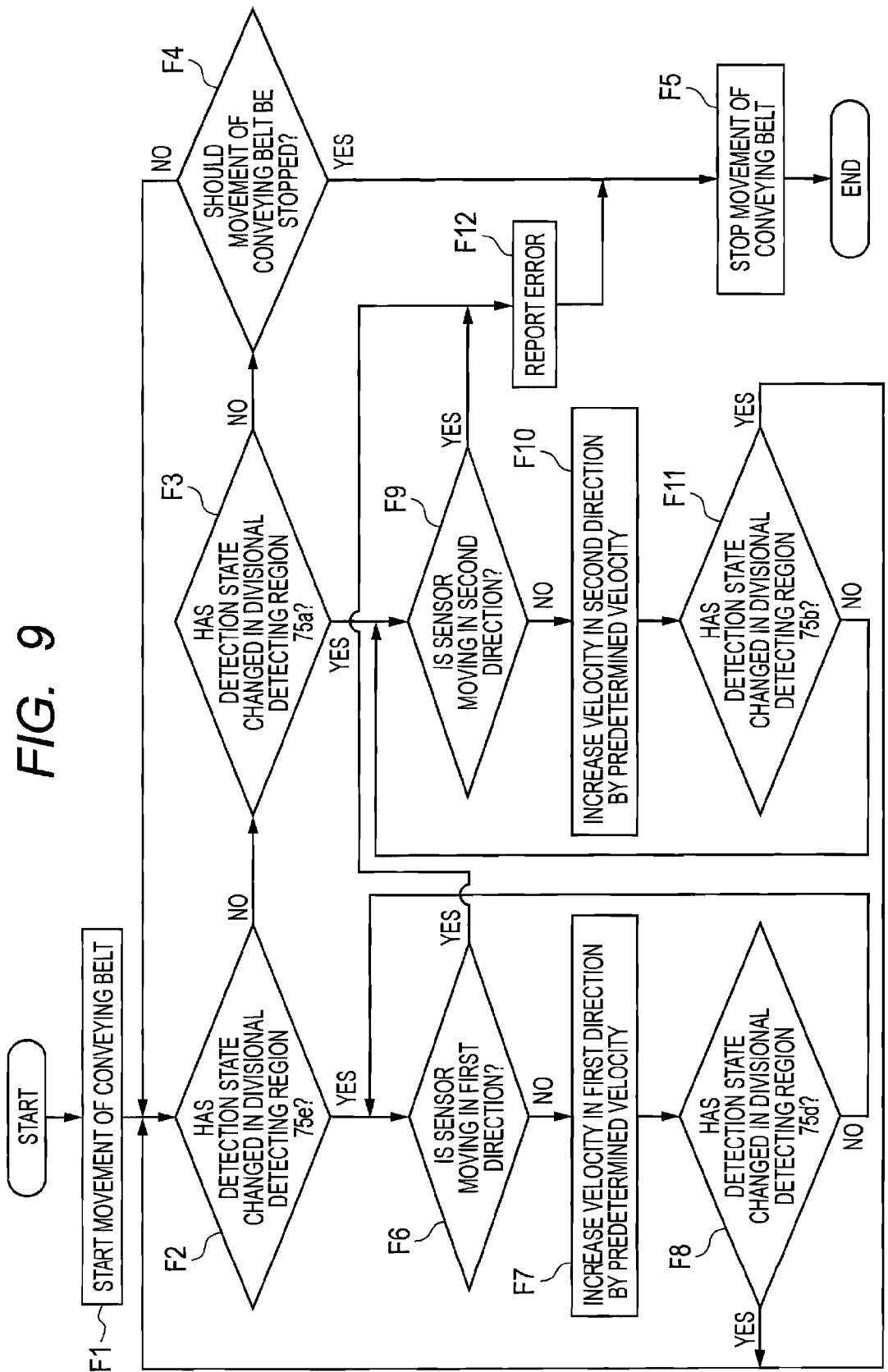
FIG. 9 is a flowchart showing a sensor moving operation executed by a controller of a printer according to a third embodiment of the invention.

An inkjet printer according to a third embodiment of the invention will be described while referring to FIG. 9. The inkjet printer of the present embodiment has the same apparatus configuration as in the first embodiment, but differs from the first embodiment in the details of controls. Accordingly, like parts and components are designated by the same reference numerals to avoid duplicating description.

The determining section 141 of the controller 1p in the present embodiment determines that an error occurs, if it is determined that the sensor is moving in the first direction at a predetermined velocity when the sensor 70 is to be moved in the first direction from the divisional detecting region 75a to the divisional detecting region 75e in the main scanning direction X. Further, the determining section 141 determines that an error occurs, if it is determined that the sensor is moving in the second direction at a predetermined velocity when the sensor 70 is to be moved in the second direction from the divisional detecting region 75e to the divisional detecting region 75a in the main scanning direction X. That is, it is determined that the conveying belt 8 moves out of the detecting region 75 due to such a large amount of meandering that controls by the meandering-correction control section 136 cannot follow meandering of the conveying belt 8. At this time, the determining section 141 controls the buzzer 38 to emit a sound when it is determined that the error occurs. Thus, the user can be encouraged to perform a maintenance operation for restoring the conveying belt 8 to the reference position RP.

The sensor-movement control section 143 can move the sensor 70 in the first direction and in the second direction at the predetermined velocity. That is, the sensor-movement control section 143 has a state in which the sensor 70 moves in the first direction at the predetermined velocity, a state in which the sensor 70 does not move, and a state in which the sensor 70 moves in the second direction at the predetermined velocity. The sensor-movement control section 143 controls the motor 83 so that velocity increases in the first direction by the predetermined velocity when the detection state has changed from ON to OFF in the divisional detecting region 75e of the sensor 70. Also, the sensor-movement control section 143 controls the motor 83 so that velocity increases in the second direction by the predetermined velocity when the detection state has changed from OFF to ON in the divisional detecting region 75*a* of the sensor 70.

Next, a sensor moving operation in response to meandering of the conveying belt 8 will be described below with reference to FIG. 9. As shown in FIG. 9, in step 1 (F1), the controller 1*p* of the printer 1 controls the conveying motor 121 to move the conveying belt 8. Normally, movement of the conveying belt 8 is started when a recording operation onto paper P is performed. Note that, during a period after step 1 is executed and until movement of the conveying belt 8 is stopped, the meandering-correction control section 136 controls the motor 33 and the conveying motor 121 to perform meandering correction for restoring the conveying belt 8 to the reference position RP, based on detection signals of the sensor 70.

In step 2 (F2), if the detection state has not changed in the divisional detecting region 75*e* of the sensor 70 located at the reference detecting position (F2: NO), the controller 1*p* proceeds to step 3 (F3). If the detection state has changed (F2: YES), the controller 1*p* proceeds to step 6 (F6). In step 3, if the detection state has not changed in the divisional detecting region 75*a* of the sensor 70 located at the reference detecting position (F3: NO), the controller 1*p* proceeds to step 4 (F4). If the detection state has changed (F3: YES), the controller 1*p* proceeds to step 9 (F9). In step 4, the controller 1*p* determines whether movement of the conveying belt 8 should be stopped. If movement of the conveying belt 8 should not be stopped (F4: NO), the controller 1*p* returns to step 2. On the other hand, if a recording operation etc. onto paper P is finished and movement of the conveying belt 8 should be stopped (F4: YES), the controller 1*p* proceeds to step 5 (F5).

In step 6, the determining section 141 determines whether the sensor 70 is moving in the first direction (rightward in FIG. 3) at the predetermined velocity. The controller 1*p* proceeds to step 12 (F12) if the sensor 70 is moving in the first direction at the predetermined velocity (F6: YES), and proceeds to step 7 (F7) if the sensor 70 is not (F6: NO). In step 7, the sensor-movement control section 143 controls the motor 83 to increase velocity of the sensor 70 in the first direction by the predetermined velocity. That is, if the sensor 70 is stopped (not moving), the sensor-movement control section 143 controls the sensor 70 to move in the first direction at the predetermined velocity. If the sensor 70 is moving in the second direction at the predetermined velocity, the sensor-movement control section 143 controls the sensor 70 to stop its movement. In step 8 (F8), if the detection state has changed in the divisional detecting region 75*d* of the sensor 70 within a predetermined period after the sensor 70 is moved at the predetermined velocity in step 7 (F8: YES), the controller 1*p* returns to step 2. If the detection state has not changed (F8: NO), the controller 1*p* returns to step 6. Here, if the sensor 70 is already moving in the first direction at the predetermined velocity after returning to step 6, the controller 1*p* proceeds to step 12.

In step 9, the determining section 141 determines whether the sensor 70 is moving in the second direction (leftward in FIG. 3) at the predetermined velocity. The controller 1*p* proceeds to step 12 (F12) if the sensor 70 is moving in the second direction at the predetermined velocity (F9: YES), and proceeds to step 10 (F 10) if the sensor 70 is not (F9: NO). In step 10, the sensor-movement control section 143 controls the motor 83 to increase velocity of the sensor 70 in the second direction by the predetermined velocity. That is, if the sensor 70 is stopped (not moving), the sensor-movement control section 143 controls the sensor 70 to move in the second direction at the predetermined velocity. If the sensor 70 is moving in the first direction at the predetermined velocity, the sensor-movement control section 143 controls the sensor 70 to stop its movement. In step 11 (F11), if the detection state has changed in the divisional detecting region 75*b* of the sensor 70 within a predetermined period after the sensor 70 is moved at the predetermined velocity in step 10 (F 11: YES), the controller 1*p* returns to step 2. If the detection state has not changed (F11: NO), the controller 1*p* returns to step 9. Here, if the sensor 70 is already moving in the second direction at the predetermined velocity after returning to step 9, the controller 1*p* proceeds to step 12.

In step 12, the determining section 141 determines that an error occurs in which detection of the conveying belt 8 in the main scanning direction X cannot be performed, and proceeds to step 5 and also controls the buzzer 38 to inform the user that an error occurs. In other words, the user is encouraged to perform a maintenance operation for restoring the conveying belt 8 to the reference position RP. In step 5, the conveying control section 132 controls the conveying motor 121 to stop movement of the conveying belt 8. In this way, the sensor moving operation in response to meandering of the conveying belt 8 is finished.

As described above, according to the printer in the present embodiment, when the detection state has changed in the divisional detecting region 75*e*, the moving velocity of the sensor 70 is increased in the first direction. Hence, the conveying belt 8 can be detected reliably in the detecting region 75 of the sensor 70. Further, when the detection state has changed in the divisional detecting region 75*a*, the moving velocity of the sensor 70 is increased in the second direction. Hence, the conveying belt 8 can be detected reliably in the detecting region 75 of the sensor 70. For the configurations similar to those in the above-described first and second embodiments, similar effects can be obtained.

Figure 10:
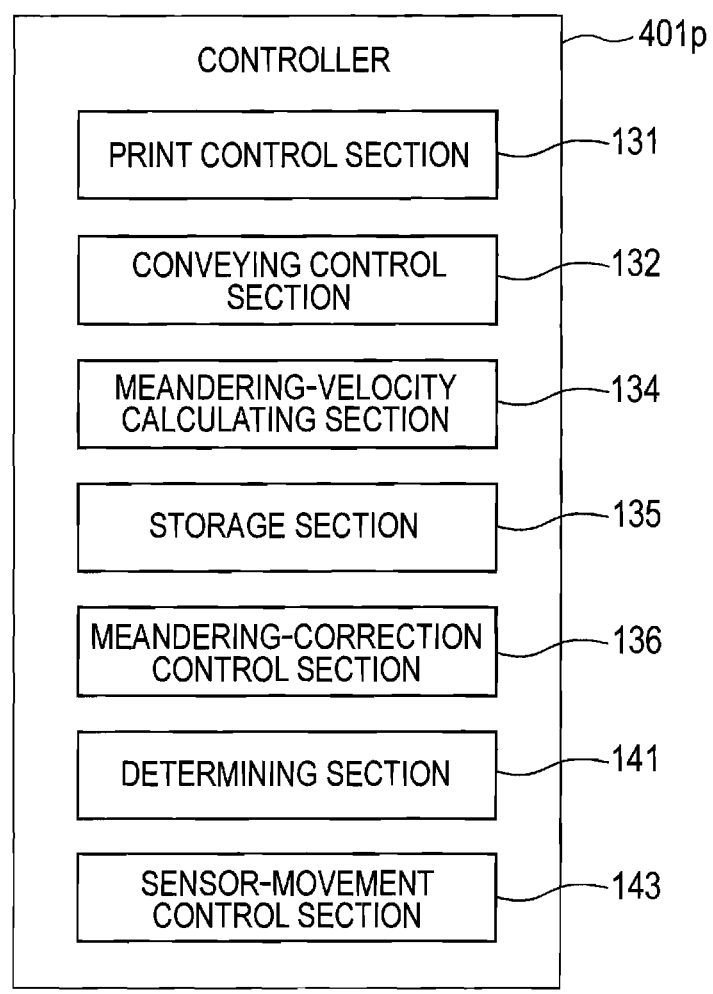
FIG. 10 is a block diagram showing a schematic configuration of a controller of a printer according to a fourth embodiment of the invention.
Figure 11:
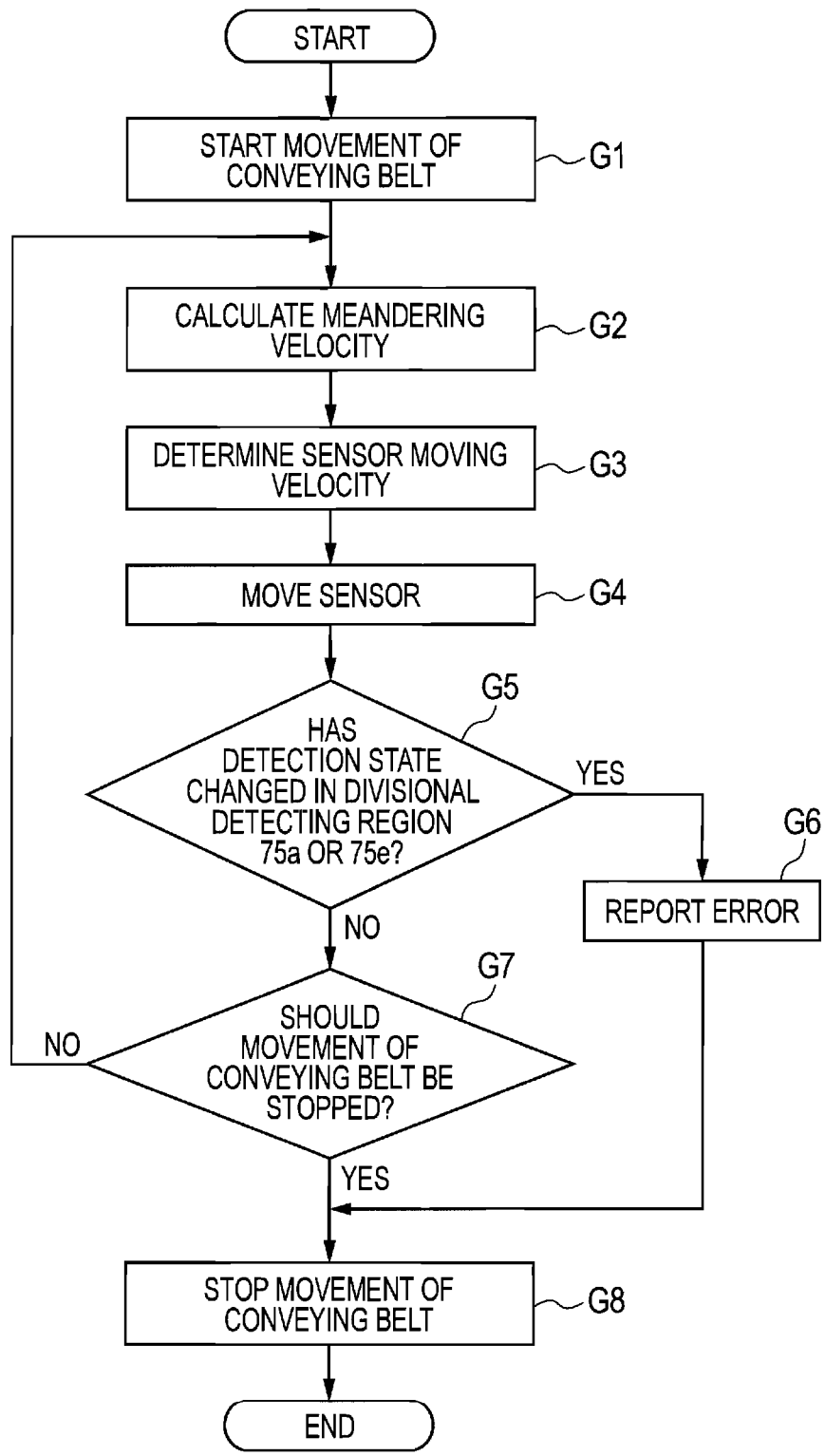
FIG. 11 is a flowchart showing a sensor moving operation executed by the controller of the printer according to the fourth embodiment.

An inkjet printer according to a fourth embodiment of the invention will be described while referring to FIGS. 10 and 11. The inkjet printer of the present embodiment has approximately the same apparatus configuration as in the first embodiment, but differs from the first embodiment in the details of controls. Accordingly, like parts and components are designated by the same reference numerals to avoid duplicating description.

A controller 401*p* of the present embodiment includes a meandering-velocity calculating section 134 and a storage section 135, in addition to the functioning sections of the controller 1*p*. The meandering-velocity calculating section 134 calculates a meandering velocity (a displacement velocity of the conveying belt 8 in the main scanning direction X) for each predetermined period in accordance with an amount of change in a position of the conveying belt 8 in the main scanning direction X per unit period, based on detection signals from the sensor 70 (signals indicative of the position of the conveying belt 8 in the main scanning direction X). At this time, the meandering velocity calculated by the meandering-velocity calculating section 134 has a positive value when the conveying belt 8 moves toward the connecting section 73*c* (the first direction from the divisional detecting region 75*a* toward the divisional detecting region 75*e*), and has a negative value when the conveying belt 8 moves away from the connecting section 73*c* (the second direction from the divisional detecting region 75*e* toward the divisional detecting region 75*a*). In this way, the controller 401*p* including the meandering-velocity calculating section 134 etc. and the sensor 70 serve as a measuring section that measures the position of the conveying belt 8 in the main scanning direction X and the meandering velocity.

The storage section 135 stores a reference sensor moving velocity +T for a range of meandering velocity from 0 to a reference meandering velocity +V, and a reference sensor moving velocity −T for a range of meandering velocity from a reference meandering velocity −V to 0. Here, the moving velocity of the sensor 70 is positive if the moving direction of the sensor 70 is in the first direction, and the moving velocity of the sensor 70 is negative if the moving direction of the sensor 70 is in the second direction. The storage section 135 also stores a positive-side moving velocity T1 for velocity exceeding the reference meandering velocity +V to the positive side, and a negative-side moving velocity T2 for velocity exceeding the reference meandering velocity −V to the negative side. Note that the reference meandering velocity V is a value that is preliminary determined based on a presumed meandering velocity. The reference sensor moving velocity ±T is selected as a sensor moving velocity that is faster than a calculated meandering velocity in the same direction when the calculated meandering velocity falls within a range between the reference meandering velocities ±V. The positive-side moving velocity T1 and the negative-side moving velocity T2 are larger values than the reference sensor moving velocity ±T in the respective directions (That is, the positive-side moving velocity T1 and the negative-side moving velocity T2 have larger absolute values than the reference sensor moving velocity ±T).

The determining section 141 determines that an error occurs if the detection state has changed in the divisional detecting region 75e when the sensor 70 is moving in the first direction. Further, the determining section 141 determines that an error occurs if the detection state has changed in the divisional detecting region 75a when the sensor 70 is moving in the second direction. That is, it is determined that the conveying belt 8 moves out of the detecting region 75 due to such a large amount of meandering that controls by the meandering-correction control section 136 cannot follow meandering of the conveying belt 8. At this time, the determining section 141 controls the buzzer 38 to emit a sound when it is determined that the error occurs. Thus, the user can be encouraged to perform a maintenance operation for restoring the conveying belt 8 to the reference position RP.

The sensor-movement control section (velocity determining section) 143 determines within which of ranges stored in the storage section 135 the meandering velocity calculated by the meandering-velocity calculating section 134 falls. The sensor-movement control section 143 determines the moving velocity of the sensor 70 based on the meandering velocity of the conveying belt 8, and controls the motor 83 so that the sensor 70 moves at the determined moving velocity. That is, if the meandering velocity calculated by the meandering-velocity calculating section 134 falls within the range from 0 to the reference meandering velocity +V, the sensor-movement control section 143 controls the motor 83 so that the sensor 70 moves at the reference sensor moving velocity +T. If the meandering velocity calculated by the meandering-velocity calculating section 134 falls within the range from the reference meandering velocity −V to 0, the sensor-movement control section 143 controls the motor 83 so that the sensor 70 moves at the reference sensor moving velocity −T. If the meandering velocity calculated by the meandering-velocity calculating section 134 exceeds the reference meandering velocity +V to the positive side, the sensor-movement control section 143 controls the motor 83 so that the sensor 70 moves at the positive-side moving velocity T1. If the meandering velocity calculated by the meandering-velocity calculating section 134 exceeds the reference meandering velocity −V to the negative side, the sensor-movement control section 143 controls the motor 83 so that the sensor 70 moves at the negative-side moving velocity T2.

Next, a sensor moving operation in response to meandering of the conveying belt 8 will be described below with reference to FIG. 11. As shown in FIG. 11, in step 1 (G1), the controller 401p of the printer 1 controls the conveying motor 121 to move the conveying belt 8. Normally, movement of the conveying belt 8 is started when a recording operation onto paper P is performed. Note that, during a period after step 1 is executed and until movement of the conveying belt 8 is stopped, the meandering-correction control section 136 controls the motor 33 and the conveying motor 121 to perform meandering correction for restoring the conveying belt 8 to the reference position RP, based on detection signals of the sensor 70.

In step 2 (G2), the meandering-velocity calculating section 134 calculates the meandering velocity (including directional component) based on detection signals from the sensor 70 (signals indicative of the position of the conveying belt 8 in the main scanning direction X). In step 3 (G3), the sensor-movement control section 143 determines within which of ranges stored in the storage section 135 the meandering velocity calculated by the meandering-velocity calculating section 134 falls, and determines the moving velocity of the sensor 70. That is, the sensor-movement control section 143 selects one of the reference sensor moving velocity ±T, the positive-side moving velocity T1, and the negative-side moving velocity T2 stored in the storage section 135. In step 4 (G4), the sensor-movement control section 143 controls the motor 83 to move the sensor 70 at the determined velocity.

In step 5 (G5), if it is within a predetermined period after the sensor 70 is moved at the velocity determined in step 3 and if the sensor 70 is moving in the first direction, the determining section 141 determines whether the detection state has changed in the divisional detecting region 75e. The controller 401p proceeds to step 6 (G6) if the detection state has changed (G5: YES), and proceeds to step 7 (G7) if the detection state has not changed (G5: NO). Further, if it is within a predetermined period after the sensor 70 is moved at the velocity determined in step 3 and if the sensor 70 is moving in the second direction, the determining section 141 determines whether the detection state has changed in the divisional detecting region 75a. The controller 401p proceeds to step 6 (G6) if the detection state has changed (G5: YES), and proceeds to step 7 (G7) if the detection state has not changed (G5: NO).

In step 6, the determining section 141 determines that an error occurs that detection of the conveying belt 8 in the main scanning direction X cannot be performed, and proceeds to step 8 (G8) and also controls the buzzer 38 to inform the user that an error occurs. In other words, the user is encouraged to perform a maintenance operation for restoring the conveying belt 8 to the reference position RP. In step 7, the controller 401p determines whether movement of the conveying belt 8 should be stopped. If movement of the conveying belt 8 should not be stopped (G7: NO), the controller 401p returns to step 2. On the other hand, if a recording operation etc. onto paper P is finished and movement of the conveying belt 8 should be stopped (G7: YES), the controller 401p proceeds to step 8. In step 8, the conveying control section 132 controls the conveying motor 121 to stop movement of the conveying belt 8. In this way, the moving operation of the sensor 70 in response to meandering of the conveying belt 8 is finished. Note that calculation of the meandering velocity of the conveying belt 8 in step 2 is executed at a predetermined time interval. Here, the predetermined time interval is set to a period that is sufficiently short relative to the meandering velocity of the conveying belt 8.

As described above, according to the printer in the present embodiment, the sensor 70 moves so as to follow meandering of the conveying belt 8. Hence, the conveying belt 8 can be constantly detected by the sensor 70. Further, the moving velocity of the sensor 70 is set to a velocity in accordance with the meandering velocity of the conveying belt 8. Hence, a relative position of the sensor 70 to the conveying belt 8 is unchanged. Note that, in the present embodiment, the moving velocity at which the sensor-movement control section 143 moves the sensor 70 is velocities that are determined preliminarily (the reference sensor moving velocity ±T, the positive-side moving velocity T1, and the negative-side moving velocity T2). Alternatively, the sensor-movement control section 143 may move the sensor 70 at the same velocity as the meandering velocity calculated by the meandering-velocity calculating section 134. For the configurations similar to those in the above-described first through third embodiments, similar effects can be obtained.

While the invention has been described in detail with reference to the above aspects thereof, it would be apparent to those skilled in the art that various changes and modifications may be made therein without departing from the scope of the claims.

For example, in the first through third embodiment, the sensor 70 is moved when the detection state has changed in either the divisional detecting region 75a or 75e. However, the sensor 70 may be moved when the detection state has changed in either the divisional detecting region 75b or 75d. Further, the sensor 70 in the first, third, and fourth embodiments is moved in the main scanning direction X by the moving mechanism 80. However, the sensor 70 may be moved in a direction intersecting the conveying direction D, other than the main scanning direction X.

Further, the sensor 70 in the present embodiment detects the position of the conveying belt 8 in the main scanning direction X by detecting one end of the conveying belt 8 in the main scanning direction X. However, a through-hole may be formed at an end portion of the conveying belt 8, so that a sensor can detect the position of the through-hole in order to detect the position of the conveying belt 8 in the main scanning direction. Further, the sensor for detecting an end portion of the conveying belt 8 in the main scanning direction may detect both ends of the conveying belt 8 in the main scanning direction.

The invention can be applied to both of line-type and serial-type recording apparatuses. The invention can be applied to a facsimile apparatus, a copier, and the like, as well as a printer. Further, the invention can be applied to a recording apparatus that performs recording by ejecting liquid other than ink. The invention can be applied to a recording apparatus of, for example, a laser type, a thermal type, and the like, as well as an inkjet type. A recording medium may be various mediums on which recording can be performed, as well as paper P.

What is claimed is:

1. A recording apparatus comprising:
   a recording section configured to record an image on a recording medium;
   an endless conveying belt having a surface disposed in confrontation with the recording section and configured to move in a conveying direction with the recording medium supported by the surface, thereby conveying the recording medium in the conveying direction;
   a measuring section having a detecting region and configured to measure a position of the conveying belt with respect to a perpendicular direction that is perpendicular to the conveying direction, the measuring section comprising an optical sensor that is configured to detect the position of the conveying belt with respect to the perpendicular direction; and
   a sensor moving section configured to move the sensor based on a measurement result of the measuring section, such that the conveying belt is detected in the detecting region,
   wherein the sensor moving section is configured to move the sensor linearly in a direction intersecting the conveying direction,
   wherein the detecting region includes a plurality of divisional detecting regions arranged in the perpendicular direction, the plurality of divisional detecting regions having a first end side and a second end side,
   wherein the measuring section is configured to measure the position of the conveying belt with respect to the perpendicular direction, based on at which of the plurality of divisional detecting regions one end portion of the conveying belt in the perpendicular direction is located,
   wherein the sensor moving section comprises a velocity determining section that is configured to determine a moving velocity of the sensor, the sensor moving section being configured to move the sensor at the moving velocity determined by the velocity determining section, and
   wherein the velocity determining section is configured, when a detection state of the conveying belt has changed at the first end side, to change the moving velocity of the sensor such that the moving velocity increases in a first-end direction that is a direction from the second end side toward the first end side.

2. The recording apparatus according to claim 1, wherein the detecting region extends in the perpendicular direction.

3. The recording apparatus according to claim 1, wherein, if the sensor is not moving when the detection state of the conveying belt has changed at the first end side, the sensor moving section is configured to move the sensor in the first-end direction at a predetermined velocity; and
   wherein, if the sensor is moving in a second-end direction at the predetermined velocity when the detection state of the conveying belt has changed at the first end side, the sensor moving section is configured to stop the sensor, the second-end direction being a direction from the first end side toward the second end side.

4. The recording apparatus according to claim 1, wherein the sensor is a transmission-type optical sensor having a light emitting element, a light receiving element, a substantially U-shaped frame that supports the light emitting element and the light receiving element in confrontation with each other so as to form the detecting region between the elements.

5. The recording apparatus according to claim 1, further comprising a meandering correcting section configured to restore the conveying belt to a reference position, based on a measurement result by the measuring section.

6. The recording apparatus according to claim 5, wherein the meandering correcting section comprises a belt roller around which the conveying belt is looped, the belt roller having a roller shaft; and
   wherein the meandering correcting section is configured to move the conveying belt in the perpendicular direction by changing tilt of the roller shaft.

7. The recording apparatus according to claim 6, wherein the meandering correcting section further comprises:
   a bearing configured to rotatably support one end of the roller shaft, the bearing being formed with a hole having an inner circumferential surface, first thread being formed on the inner circumferential surface; and a motor having a motor shaft having an outer circumferential surface, second thread meshing with the first thread being formed on the outer circumferential surface, and wherein, when the motor shaft is rotated forward or reversely, the bearing is configured to move toward or away from the motor so as to change the tilt of the roller shaft.

8. A recording apparatus comprising:

a recording section configured to record an image on a recording medium;

an endless conveying belt having a surface disposed in confrontation with the recording section and configured to move in a conveying direction with the recording medium supported by the surface, thereby conveying the recording medium in the conveying direction;

a measuring section having a detecting region and configured to measure a position of the conveying belt with respect to a perpendicular direction that is perpendicular to the conveying direction, the measuring section comprising an optical sensor that is configured to detect the position of the conveying belt with respect to the perpendicular direction; and a sensor moving section configured to move the sensor based on a measurement result of the measuring section, such that the conveying belt is detected in the detecting region, wherein the sensor moving section is configured to move the sensor linearly in a direction intersecting the conveying direction, wherein the sensor moving section is configured to move the sensor such that a relative position of the conveying belt to the sensor is unchanged, wherein the measuring section is configured to measure a displacement velocity of the conveying belt in the perpendicular direction based on an amount of change per unit time of a position of the conveying belt in the perpendicular direction, and wherein the sensor moving section comprises a velocity determining section that is configured to determine a moving velocity of the sensor based on the displacement velocity measured by the measuring section, the sensor moving section being configured to move the sensor at the moving velocity determined by the velocity determining section.

9. The recording apparatus according to claim 8, wherein, if the moving velocity falls within a range from 0 to a reference meandering velocity +V, the sensor moving section is configured to move the sensor at a reference sensor moving velocity +T;

wherein, if the moving velocity falls within a range from a reference meandering velocity −V to 0, the sensor moving section is configured to move the sensor at a reference sensor moving velocity −T;

wherein, if the moving velocity exceeds the reference meandering velocity +V to a positive side, the sensor moving section is configured to move the sensor at a positive-side moving velocity T1 that has a larger absolute value than the reference sensor moving velocity +T; and wherein, if the moving velocity exceeds the reference meandering velocity −V to a negative side, the sensor moving section is configured to move the sensor at a negative-side moving velocity T2 that has a larger absolute value than the reference sensor moving velocity −T.

10. The recording apparatus according to claim 8, wherein the detecting region extends in the perpendicular direction.

11. The recording apparatus according to claim 8, wherein the sensor is a transmission-type optical sensor having a light emitting element, a light receiving element, a substantially U-shaped frame that supports the light emitting element and the light receiving element in confrontation with each other so as to form the detecting region between the elements.

12. The recording apparatus according to claim 8, further comprising a meandering correcting section configured to restore the conveying belt to a reference position, based on a measurement result by the measuring section.

13. The recording apparatus according to claim 12, wherein the meandering correcting section comprises a belt roller around which the conveying belt is looped, the belt roller having a roller shaft; and wherein the meandering correcting section is configured to move the conveying belt in the perpendicular direction by changing tilt of the roller shaft.

14. The recording apparatus according to claim 13, wherein the meandering correcting section further comprises:

a bearing configured to rotatably support one end of the roller shaft, the bearing being formed with a hole having an inner circumferential surface, first thread being formed on the inner circumferential surface; and a motor having a motor shaft having an outer circumferential surface, second thread meshing with the first thread being formed on the outer circumferential surface, and wherein, when the motor shaft is rotated forward or reversely, the bearing is configured to move toward or away from the motor so as to change the tilt of the roller shaft.

15. A recording apparatus comprising:

a recording section configured to record an image on a recording medium;

an endless conveying belt having a surface disposed in confrontation with the recording section and configured to move in a conveying direction with the recording medium supported by the surface, thereby conveying the recording medium in the conveying direction;

a measuring section having a detecting region and configured to measure a position of the conveying belt with respect to a perpendicular direction that is perpendicular to the conveying direction, the measuring section comprising an optical sensor that is configured to detect the position of the conveying belt with respect to the perpendicular direction; and a sensor moving section configured to move the sensor based on a measurement result of the measuring section, such that the conveying belt is detected in the detecting region, wherein the measuring section comprises:
  a plurality of optical sensors; and
  a support plate that supports the plurality of optical sensors, the measuring section being configured to measure a position of the conveying belt in the perpendicular direction based on detection results of the plurality of optical sensors, wherein the sensor moving section comprises a rotating section that is configured to rotate the support plate about a rotational center, wherein, when straight lines passing through the rotational center and each detecting region of the plurality of optical sensors are defined, the plurality of optical sensors is arranged such that neighboring ones of the straight lines form a predetermined angle therebetween and that projective detecting regions are arranged continuously along an imaginary straight line passing through the rotational center on the support plate, the projective detecting regions being defined by projecting each detecting region of the plurality of optical sensors onto the imaginary straight line along a rotational direction, and wherein the rotating section is configured to rotate the support plate such that detection is performed in the detecting region of one of the plurality of optical sensors.

16. The recording apparatus according to claim 15, wherein the sensor is a transmission-type optical sensor having a light emitting element, a light receiving element, a substantially U-shaped frame that supports the light emitting element and the light receiving element in confrontation with each other so as to form the detecting region between the elements.

17. The recording apparatus according to claim 15, further comprising a meandering correcting section configured to restore the conveying belt to a reference position, based on a measurement result by the measuring section.

18. The recording apparatus according to claim 17, wherein the meandering correcting section comprises a belt roller around which the conveying belt is looped, the belt roller having a roller shaft; and wherein the meandering correcting section is configured to move the conveying belt in the perpendicular direction by changing tilt of the roller shaft.

19. The recording apparatus according to claim 18, wherein the meandering correcting section further comprises:

a bearing configured to rotatably support one end of the roller shaft, the bearing being formed with a hole having an inner circumferential surface, first thread being formed on the inner circumferential surface; and a motor having a motor shaft having an outer circumferential surface, second thread meshing with the first thread being formed on the outer circumferential surface, and wherein, when the motor shaft is rotated forward or reversely, the bearing is configured to move toward or away from the motor so as to change the tilt of the roller shaft.

* * * * *